United States Patent [19]

Miller et al.

[11] Patent Number: 4,576,014

[45] Date of Patent: Mar. 18, 1986

[54] PRODUCE VACUUM COOLER WITH IMPROVED VENTING

[75] Inventors: Craig A. Miller; Floyd E. Miller, both of Fremont, Calif.

[73] Assignee: Western Precooling Systems, Inc., Fremont, Calif.

[21] Appl. No.: 697,050

[22] Filed: Jan. 31, 1985

[51] Int. Cl.$^4$ ............................................. F25B 19/00
[52] U.S. Cl. ............................................. 62/268; 62/70
[58] Field of Search ...................... 62/100, 268, 69, 70

[56] References Cited

U.S. PATENT DOCUMENTS 1,892,026 12/1932 Zeiber ...................................... 62/70
3,844,132 10/1974 Miller et al. ......................... 62/268

Primary Examiner—Ronald C. Capossela
Attorney, Agent, or Firm—Gerald L. Moore

[57] ABSTRACT

A vacuum cooler for produce and the like comprising a vacuum tube (9) forming a vacuum chamber (10) in which the produce is placed. A vacuum pump (13) lowers the atmospheric pressure while cold water is circulated over the produce by a pump (24) forcing the water through nozzles (22). The invention comprises a venting system allowing outside air into the vacuum chamber to raise the pressure back to atmospheric level to allow removal of the cooled produce. A vent pipe (42) includes an outlet (44) positioned beneath the water level in the pump (29). By causing the incoming air to enter the vacuum chamber through the water, the pressure rise is slowed, pressure differentials throughout the vacuum chamber are reduced, and the humidity level of the air entering the chamber is raised to reduce vacuum infiltration of water into the produce.

5 Claims, 1 Drawing Figure

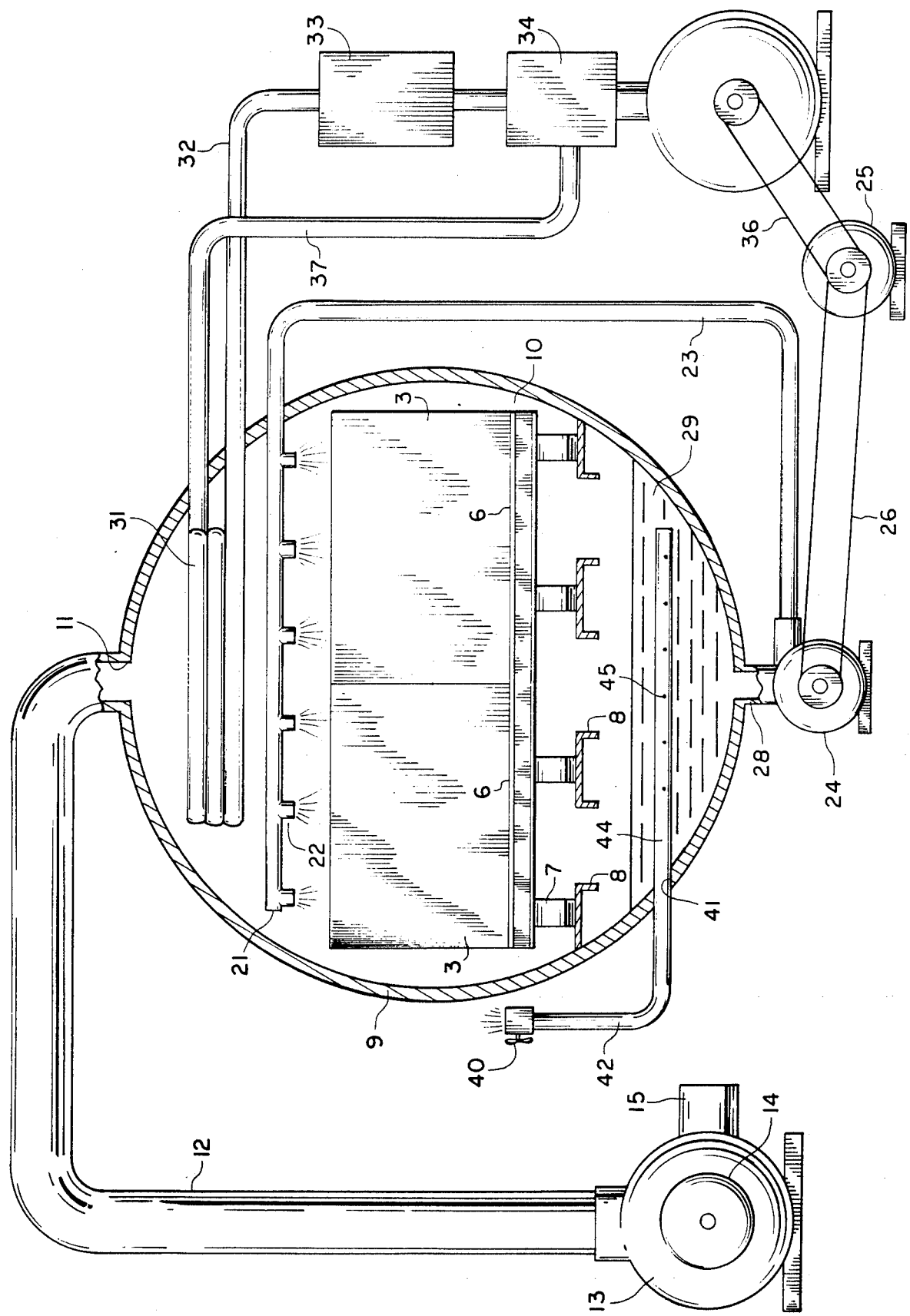

PRODUCE VACUUM COOLER WITH IMPROVED VENTING

FIELD OF THE INVENTION

Apparatus for cooling produce of the type wherein the produce is subjected to sub-atmospheric pressure and cold water for cooling. An improved venting system reduces water spotting of the produce.

BACKGROUND OF THE INVENTION

It is necessary to remove field heat and chill produce primarily for the purposes of preserving it during shipment to market. One method of quickly cooling produce is illustrated in U.S. Pat. No. 3,844,132, Produce Cooler and Method of Cooling Product, issued on Oct. 29, 1974. In this patent there is described an apparatus comprising a vacuum chamber for receiving the produce. A vacuum pump is used to reduce the pressure within the chamber to a sub-atmospheric level causing the evaporation of moisture in the produce which acts to take the heat of vaporization from the produce thereby reducing the produce temperature. Water vapor resulting from the vaporization condenses on cooling coils positioned over the produce. The cold water flows down across the produce and further cools it.

Additionally, a recirculation system picks up water from the resevoir at the bottom of the vacuum chamber and sprays it over the produce for a further cooling effect.

To allow removal of the produce from the vacuum chamber after it is cooled, a venting system is provided which permits outside air to flow into the vacuum chamber. Naturally, it is necessary that the chamber be brought to atmospheric pressure before being opened. As shown in this patent, venting is accomplished by opening a valve in a pipe extending from the outside atmosphere into the chamber. The outside air is allowed to flow directly into the chamber to cause the pressure to equalize the atmospheric level.

It is known that one result of the rapid pressure increase within the vacuum chamber is vacuum infiltration of moisture into the product. Such occurs especially with the softer, more pourous products such as lettuce, spinach and the like. This phenomena occurs when water lies on the surface of the produce during rapid pressurization. At this time the surface water is forced into the produce by the pressure internal taking longer to rise than that external the produce. While no permanent harm is done to the produce, the water saturated area remains until evaporation of the water takes place and that can be a time period of twenty-four to forty-eight hours. During this time period the water infiltrated area appears as a bruise or discolored area which is unappealing to a buyer. Obviously with the improvement described in the patent discussed heretofore such water infiltration is more pronounced because of the greater amount of water that is deposited on the produce.

It is therefore the primary object of the subject invention to provide a vacuum cooling apparatus which reduces or substantially eliminates vacuum infiltration of the product.

SUMMARY OF THE INVENTION

A produce cooler comprising a vacuum chamber in which is drawn a partial vacuum for cooling produce therein by an evaporative process,
    means for cooling and condensing water vapor in the chamber such that the condensed water flows over the produce in addition to that pumped over the produce from a resevoir in the bottom of the vacuum chamber, and
    means to vent the chamber to the outside atmosphere to raise the pressure to an atmospheric level including an outlet positioned beneath the water level in the resevoir so as to agitate the water and raise the humidity level in the chamber as well as to slow and equalize the venting process and equalize it throughout the chamber.

DESCRIPTION OF THE DRAWINGS

The FIGURE is a cross-sectional view of a produce cooling apparatus incorporating the subject invention.

DESCRIPTION OF THE INVENTION

In the figure is shown a typical produce cooler for removing field heat and for cooling produce such as lettuce, celery or the like. The produce is placee in a container or cartons 3 stacked on a cart 6 supported on wheels 7 positioned to run on rails 8 extending from the outside to the interior of a vacuum tube 9. Usually the produce is packed in ventilated cartons that are stacked on the carts 6 at a manageable height.

The vacuum tube forms a vacuum chamber 10 which receives the carts. The tube is formed of metal of sufficient strength to permit a substantial partial vacuum to be drawn in the chamber. Usually the chamber is provided with end doors (not shown) to allow the carts to be rolled in and out.

For evacuating the chamber 10 a duct 12 connects with an opening 11 in the vacuum tube and extends to a vacuum pump 13 driven by a motor 14 and having outlets 15 for discharging the evacuated air into the atmosphere. Thus the produce containers can be moved into the vacuum tube on the carts 6 and a partial vacuum drawn to cause evaporation of the moisture on the produce and thereby cool the produce as such evaporation takes place. For a further cooling effect there is positioned over the produce a water manifold 21 having a plurality of spray nozzles 22 for spraying water onto the produce. A pipe 23 connects with a pump 24 driven by an electric motor 25 connedted by a belt 26. An inlet duct 28 connects with the pump 24 to supply water from a sump 29 in the bottom of the vacuum tube 9.

The water pump 24 pumps water through the pipe 23 and the manifold 21 to be sprayed out from the spray nozzles 22 onto the produce. This water flows downward over the produce and eventually flows by gravity back into the sump 29. In this manner this water is used to augment the vaporization process in absorbing field heat from the produce.

Additional cooling of the produce is achieved by cooling and condensing out the water and vapor and allowing the resulting cold condensed water to flow over the produce. For this purpose, a refrigerator coil 31 is suspended from the top of the vacuum tube 9 over the produce. The coil is supplied with a cold refrigerant through an inlet pipe 32 leading from a refrigerator mechanism 33. Connecting with this mechanism is a refrigeration compressor 34 which is also driven by the motor 25 by means of a drive belt 36. By pumping the refrigerant through the coil 31 heat is removed from the water vapor as it rises within the vacuum chamber and comes in contact with the coil. The vapor condenses into water droplets which fall by gravity over the produce and eventually flow into the sump 29. Naturally this water is cooled because of contact with the refrigerated coil and therefore tends to further remove heat from the produce. The warm refrigerant is returned from the coil through a pipe 37 connecting with the compressor 34.

From the foregoing it is apparent that the produce is cooled by evaporation of water, by a shower of water supplied through the nozzles from the sump and by cold condensate from water vapor that is cooled by contact with the refrigeration coils. Thus there is provided considerable contact of cool water with the produce which not only accelerates the heat transfer from the produce to the water, but also tends to deposit a layer of water on the produce so as to slow subsequent dehydration of the produce.

After the produce is cooled, a valve 40 is opened to allow air to flow from the outside atmosphere through an opening 41 in the vacuum tube for raising the atmospheric pressure within the vacuum chamber 10 to outside atmospheric level. This action is necessary before the chamber can be opened to allow the carts 6 to be rolled from the tube after the cooling process is finished.

Thus the produce is moved into the chamber, the doors are closed and sealed and a partial vacuum is drawn for evaporative cooling. At the same time pumps are started for spraying water over the produce and for circulating refrigerant through the cooling coils for condensing water from the vapor and allowing the cool water to flow over the produce. After the produce is sufficiently chilled by the removal of field heat, air is allowed to flow back into the vacuum chamber by the opening of the valve 40 to raise the internal pressure to the outside atmospheric level. Thereafter the doors can be opened for removal of the chilled produce and insertion of unchilled produce.

As pointed out before, one of the problems with such a process is the vacuum infiltration of water into areas of the produce surface. When the produce is vacuum infiltrated, it is discolored in those areas and appears to be bruised. As explained before, the mosture will evaporate out within twenty-four or forty-eight hours leaving no after effects on the produce, but in the meantime marketing is hindered because the discoloration appears appears to be bruising.

In accordance with the present invention, the pipe 42 extending from the valve 40 and through the opening 41 in the vacuum tube is connected to a manifold or outlet 44 which extends beneath the surface of the water in the sump 29. The manifold has air openings 45 through which the air from the outside can bubble up through the water in the sump for pressurizing the vacuum chamber 10 above the water. By extending the manifold 44 substantially along the length of the vacuum tube the air is distributed throughout the tube thereby eliminating substantially all pressure differentials within the vacuum chamber. Such pressure differentials can result in a more rapid pressure rise in some areas of the vacuum tube thereby increasing the vacuum infiltration of water into the fruit. The quicker the pressure is raised around the fruit, on which moisture is deposited, the more likely that vacuum infiltration is to occur. By elimination of any rapid pressure rise in the vacuum chamber, such vacuum infiltration is lessened.

Additionally, by allowing the air to enter the vacuum chamber beneath the surface of the water, water is agitated by the air bubbles so as to increase vaporization thereof into the vacuum chamber. Such action increases the humidity level within the vacuum chamber thereby increasing the amount of water deposited on the produce immediately before it is removed from the vacuum chamber. Since dehydration of the produce can only initiate after the water has evaporated from the produce surface, this action delays dehydration during shipment and keeps the produce fresher.

The air entering the vacuum chamber beneath the surface of the water allows a substantial amount of heat to be removed from the warmer outside air on its path through the sub 40° F. water. This removal of heat means that the vacuum is broken with cooler air. The advantage is that the produce initially comes in contact with cool, moist air as opposed to warm, dry air upon venting of the vacuum chamber.

The invention claimed:

1. A produce cooler comprising:
   a vacuum chamber,
   means in said chamber for supporting produce therein,
   means for pumping out said chamber to provide at least a partial vacuum therein,
   means in said chamber for discharging water into said chamber at a location above said produce to allow said water to flow downward over said produce,
   means for cooling and condensing water vapor in said chamber at a location above said produce to cause cool condensed water to flow downward over said produce,
   a sump in the bottom of said chamber for collecting and holding water,
   a pipe extending into said vacuum chamber from the outside to vent the outside air into said chamber through an inner end to relieve the vacuum therein so the chamber can be opened and the cooled produce removed,
   said pipe including means to regulate the flow of incoming air into said vacuum chamber to slow the rate of increase of air pressure in said vacuum chamber.

2. A produce cooler as defined in claim 1 wherein said means to regulate the flow of air into said vacuum includes an outlet connecting with said pipe inner end to distribute incoming air into said vacuum chamber, said outlet extending along the bottom of said vacuum chamber with air vents spaced therealong to distribute the incoming air along said vacuum chamber.

3. A produce cooler as defined in claim 2 wherein said outlet is located beneath the water in said sump to cause said incoming air to pass through said water as it enters said vacuum chamber.

4. A produce cooler as defined in claim 1 wherein said pipe inner end is located beneath the water in said sump to cause said incoming air to pass through said water as it enters said vacuum chamber.

5. A produce cooler comprising:
   a vacuum chamber,
   means in said chamber for supporting produce therein,
   means for pumping out said chamber to provide at least a partial vacuum therein to cool said produce by evaporation, means in said chamber for discharging water at a location above said produce in said chamber to allow said water to flow downward over said produce, a sump in the bottom of said chamber for collecting and holding water, a pipe extending into said vacuum chamber from the outside to vent outside air into said chamber through an outlet to relieve the vacuum therein so the chamber can be opened and the cooled produce removed, said pipe including means to regulate the flow of incoming air into said vacuum chamber to slow the rate of increase of air pressure in said vacuum chamber including said outlet being located beneath the water in said pump to cause said incoming air to pass through said water as it enters said vacuum chamber.

* * * * *